United States Patent [19]

Oshima et al.

[11] Patent Number: 5,362,804
[45] Date of Patent: Nov. 8, 1994

[54] CORE-SHELL POLYMER AND UNSATURATED POLYESTER RESIN COMPOSITION CONTAINING THE SAME AS LOW SHRINKING ADDITIVE

[75] Inventors: Junji Oshima, Toyonaka; Susumu Okatani, Takatsuki; Koichi Akiyama, Kamakura; Masato Sakurai, Tokyo, all of Japan

[73] Assignee: Takeda Chemical Industries, Ltd., Osaka, Japan

[21] Appl. No.: 21,945

[22] Filed: Feb. 24, 1993

[30] Foreign Application Priority Data

Feb. 25, 1992 [JP] Japan ................... 4-037868
Nov. 6, 1992 [JP] Japan ................... 4-297456

[51] Int. Cl.$^5$ ............................................ C08L 51/00
[52] U.S. Cl. ......................... 525/64; 525/286; 525/301; 525/302; 525/303; 525/305; 525/309
[58] Field of Search ............. 525/170, 301, 303, 305, 525/309, 64, 286, 302

[56] References Cited

U.S. PATENT DOCUMENTS

| | | | |
|---|---|---|---|
| 3,914,338 | 10/1975 | Krieg et al. | 525/305 |
| 4,230,813 | 10/1980 | Cooke et al. | 526/329 |
| 5,006,592 | 4/1991 | Oshima et al. | 525/64 |
| 5,053,441 | 10/1991 | Biale | 523/201 |
| 5,183,858 | 2/1993 | Sasaki et al. | 525/308 |
| 5,242,982 | 9/1993 | Oshima et al. | 525/308 |

FOREIGN PATENT DOCUMENTS 2212345 7/1974 France .

OTHER PUBLICATIONS

"Polymer Handbook", 2nd edition, New York, John Wiley 1975, pp. III-242 and 243 (Branderup & Immergut, eds).

*Primary Examiner*—Vasu S. Jagannathan
*Attorney, Agent, or Firm*—Wenderoth, Lind & Ponack

[57] ABSTRACT

An unsaturated polyester resin composition for the production of cured molded article which comprises:
an unsaturated polyester resin; and
a core-shell polymer as a low shrinking agent which comprises:
(a) a cross-linked core layer polymerized from a first monomer comprising an aromatic vinyl monomer in an amount of not less 50% by weight, the core layer being contained in the core-shell polymer in an amount of 50–90% by weight; and
(b) a shell layer polymerized from a monomer comprising methyl methacrylate in an amount of not less 50% by weight;
and the core-shell polymer having a refractive index in the range of 1.52–1.58 and within ±0.02 from the refractive index of the cured material of the unsaturated polyester resin.

7 Claims, 1 Drawing Sheet

CORE-SHELL POLYMER AND UNSATURATED POLYESTER RESIN COMPOSITION CONTAINING THE SAME AS LOW SHRINKING ADDITIVE

FIELD OF THE INVENTION

This invention relates to a core-shell polymer, an unsaturated polyester resin composition containing the same as a low shrinking additive, and a molded article formed from the resin composition. More particularly, the invention relates to a core-shell polymer suitable for use as a low shrinking additive in an unsaturated polyester resin composition, and an unsaturated polyester resin composition which contains such a low shrinking additive, and accordingly has an improved moldability, and provides a molded article having an excellent transparence and gloss.

DESCRIPTION OF THE PRIOR ART

An unsaturated polyester resin composition is normally comprised of an unsaturated polyester and a vinyl monomer copolymerizable therewith and is in wide use as a molding material.

The molding of the unsaturated polyester resin composition makes use of a so-called curing reaction wherein the vinyl monomer reacts with unsaturated groups in the unsaturated polyester to form a reticulated structure. It is well known that such curing of the unsaturated polyester resin composition is attended by shrinkage in volume of about 6–8% in the resultant molded article. Such shrinkage in volume spoils dimensional accuracy and appearance of resultant molded article. As a further problem related with such shrinkage, when the unsaturated polyester resin composition is used in combination with a reinforcement in the form of fiber, granule or any other shape to form a composite material, there remains a stress at the interface between the cured resin composition and the reinforcement so that an expected strength can not be attained.

Accordingly, for the purpose of preventing the resin composition from shrinking when being cured, there has been proposed a method wherein a low shrinking additive composed of, for example, particles of a thermoplastic resin or a cross-linked polymer is added to the resin composition. However, when such a low shrinking additive is poor in miscibility with the unsaturated polyester resin composition, a great quantity of energy may be needed to mix the additive with the resin composition and disperse the additive therein. Further, such an additive may separate from the resin composition, and may stain molds used or may result in a bad appearance of the resultant molded article. Accordingly, there is demanded such a low shrinking additive which is readily dispersible in an unsaturated polyester resin composition and remains dispersed stably in the resin composition. On the other hand, excellent moldability is also an important requisite for an unsaturated polyester resin composition so that the resin provides a molded article with no rejected article even by molding under conditions of a high temperature and a short molding time.

The unsaturated polyester resin composition has been used for the production of a variety of articles. When it is used for the production of marble-like bathtubs, kitchen counters or dressing tables, appearance having an excellent transparence and gloss is required with the molded articles.

A sheet molding compound (SMC) is described in Japanese Patent Publication No. 62-64858 which contains cross-linked polystyrene particles as a low shrinking additive together with glass powder. This molding material provides an evenly colored molded article of an excellent transparence, but the cross-linked polystyrene particle is poor in dispersibility in the unsaturated polyester resin composition, and a related improvement is needed. A further improvement is also required so that the molding material has an improved moldability at a high temperature and provides a molded article of excel lent transparence.

A low shrinking bulk molding compound (BMC) suitable for use in the production of marble-like transparent molded articles is also proposed in "Reninforced Plastic", Vol. 38, No. 2, page 4, which contains a core-shell polymer having a particle size of less than 100 microns as a low shrinking additive. This molding material also needs a further improvement in moldability and gloss at the surface of molded articles.

BRIEF SUMMARY OF THE INVENTION

Figure 1:
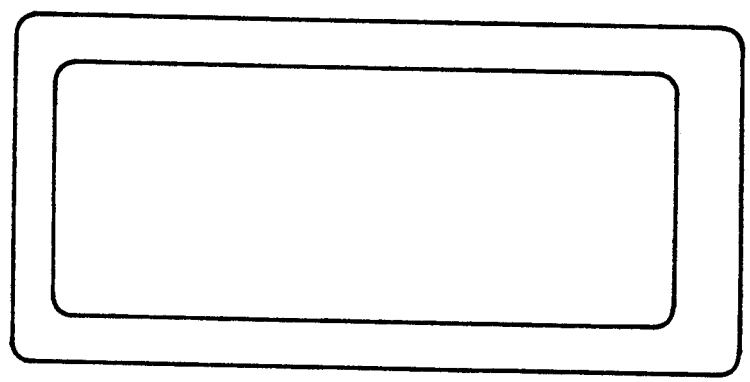
FIG. 1 is a plan view of a miniature bathtub formed of bulk molding compound (BMC) of unsaturated polyester resin composition for evaluating moldability of the BMC.

It is an object of the invention to provide a core-shell polymer composed of a core layer and a shell layer each polymerized from a specific monomer or a monomer mixture with the core layer being cross-linked, which is suitable for use as a low shrinking additive in an unsaturated polyester resin composition.

It is a specific object of the invention to provide a core-shell polymer suitable for use as a low shrinking additive in an unsaturated polyester resin composition, which is readily dispersible in the unsaturated polyester resin composition, effectively reduces shrinkage of the resin composition when being cured, and in addition which forms a resin composition which has an improved moldability to provide a molded article with an excellent tranceparence and surface gloss, but with no rejected article even by a molding at a high temperature over a short time.

Therefore, it is a further object of the invention to provide an unsaturated polyester resin composition and a molded article produced therefrom.

According to the invention, there is provided a core-shell polymer which comprises:

(a) a cross-linked core layer polymerized from a first monomer comprising an aromatic vinyl monomer in an amount of not less than 50% by weight, the core layer being contained in the core-shell polymer in an amount of 50–90% by weight; and (b) a shell layer polymerized from a monomer comprising methyl methacrylate in an amount of not less 50% by weight, and the core-shell polymer having a refractive index in the range of 1.52–1.58.

There is further provided an unsaturated polyester resin composition according to the invention, which comprises:

an unsaturated polyester resin; and a core-shell polymer as a low shrinking agent which comprises:
(a) a cross-linked core layer polymerized from a first monomer comprising an aromatic vinyl monomer in an amount of not less than 50% by weight, the core layer being contained in the core-shell polymer in an amount of 50-90% by weight; and
(b) a shell layer polymerized from a monomer comprising methyl methacrylate in an amount of not less than 50% by weight;
and the core-shell polymer having a refractive index in the range of 1.52-1.58 and within ±0.02 from the refractive index of cured material of the unsaturated polyester resin.

DETAILED DESCRIPTION OF THE INVENTION

The core-shell polymer of the present invention can be produced by a multi-stage seed emulsion polymerization method in which a polymer formed in a preceding stage is serially covered with a polymer formed in the following stage in a continuous sequence. In the multi-stage seed emulsion polymerization method, usually a seed latex is prepared by emulsion polymerization of monomers added in a lump, and then seed polymerization is carried out in the presence of the seed latex to form a core latex, followed by repetition of seed polymerization in the presence of core latex, thereby providing a latex of core-shell polymer. For the preparation of seed latex, suitable monomers are selected according to the requisites of the seed latex, but such a monomer as styrene, methyl methacrylate, or ethyl acrylate, or a mixture of these monomers, may be usually used for the preparation of seed latex.

As well known, in the emulsion polymerization, there may be used, as an emulsifier, an anionic surfactant such as sodium dodecylbenzene sulfonate or sodium lauryl sulfate, an nonionic surfactant such as poly(oxyethylene)nonylphenyl ether or sorbit an monolaurate, or a cationic surfactant such as octadecenylamine acetate. There may be used, as a polymerization initiator, a peroxide such as potassium persulfate or cumene hydroperoxide, or an azo compound such as 2,2'-azobis(2-amidinopropane) hydrochloride.

For simplicity, the production of core-shell polymer of the invention will be described, taking the case of two-stage polymerization composed of the first stage seed emulsion polymerization in the presence of seed latex to prepare a core latex or a latex of a polymer to form a core of core-shell polymer, and the second stage seed emulsion polymerization in the presence of the core latex to prepare a shell, namely a latex of core-shell polymer.

The first-stage polymerization forms a cross-linked polymer as a core by the use of a first monomer comprising an aromatic vinyl monomer in an amount of not less than 50% by weight based on the total monomer used in the first-stage and a cross-linking monomer. The aromatic vinyl monomer used includes a styrchic monomer such as styrene, α-methylstyrene or monochlorostyrene, an alkyl vinyl benzene such as vinyltoluene or ethylvinylbenzene, or a polynuclear aromatic vinyl hydrocarbon such as vinyl-naphthalene. The aromatic vinyl monomer may be used alone or as a mixture. In particular, the styrchic monomer is preferred as the aromatic vinyl monomer, and inter alia, styrene.

In the first-stage polymerization, the first monomer may contain a non-aromatic vinyl monomer copolymerizable with the aromatic vinyl monomer. The non-aromatic vinyl monomer includes, for example, a conjugated aliphatic dienie compound of 4-6 carbons such as butadiene, isoprene or chloroprene, an alkyl (meth)acrylate wherein the alkyl has 1-10 carbons such as ethyl acrylate, propyl acrylate, butyl acrylate, cyclohexyl acrylate, 2-ethylhexyl acrylate, methyl methacrylate or butyl methacrylate, or a vinyl cyanide or a vinylidene cyanide such as acrylonitrile or methacrylonitrile.

It is necessary that the core-shell polymer of the invention has a cross-linked core layer so that it is useful as a low shrinking additive used in an unsaturated polyester resin composition. The cross-linked core layer is prepared by copolymerization of the above mentioned aromatic vinyl monomer (and a non-aromatic vinyl monomer, if necessary) with a polyfunctional monomer which is copolymerizable with the aromatic vinyl monomer (and the non-aromatic vinyl monomer used).

The use of cross-linking monomer is well known in the field of production of core-shell polymer, as described in U.S. Pat. No. 4,096,202 to Farnham et al. The cross-linking monomer is a polyfunctional monomer which has a plurality of addition-polymerizable ethylenically unsaturated bonds in the molecule all of which have substantially the same polymerization reactivity. Accordingly, the cross-linking monomer provides a partial reticulated structure with the polymer which forms the core layer of the core-shell polymer. Namely the cross-linking monomer provides a partial cross-linked structure in the core layer.

There may be used as such a cross-linking monomer, for example, an aromatic divinyl monomer such as divinylbenzene, or an alkane polyol poly(meth)acrylate such as ethylene glycol diacrylate, butylene glycol diacrylate, hexanediol diacrylate, hexanediol dimethacrylate, oligoethylene glycol diacrylates, oligoethylene glycol dimethacrylates, trimethylolpropane diacrylate, trimethylolpropane dimethacrylate, trimethylolpropane triacrylate or trimethylolpropane trimethacrylate. Among these, divinylbenzene is particularly preferred.

In the first-stage polymerization to prepare a core layer of core-shell polymer, the amount of cross-linking monomer used is closely related with the effectiveness of the core-shell polymer as a low shrinking additive for an unsaturated polyester resin composition. However, it is usually in the range of 0.01-5% by weight based on the total monomers used in the first-stage polymerization. The amount is preferably in the range of 0.05-2% by weight, and most preferably in the range of 0.1-1% by weight, based on the total monomers used in the first-stage polymerization.

Further according to the invention, a grafting monomer may also be used as a part of the monomers in the first-stage polymerization. The use of grafting monomer is also well known in the field of production of core-shell polymer, as described in the same U.S. patent as above mentioned.

The grafting monomer is a polyfunctional monomer which has a plurality of addition-polymerizable ethylenically unsaturated bonds in the molecule at least one of which has a different polymerization reactivity from at least one other of the addition-polymerizable ethylenically unsaturated bonds. The grafting monomer provides a residual level of unsaturation in the resultant polymer particles or cores at or near the surface thereof in the first-stage polymerization, and the residual addition-polymerizable unsaturation participates in the subsequent second-stage polymerization so that at least a portion of the resultant polymer layer or shell layer is chemically attached to the surface of core at the interface.

The preferred grafting monomer is an allyl ester of an ethylenically unsaturated carboxylic acid such as allyl acrylate, allyl methacrylate, diallyl maleate, diallyl fumarate, diallyl itaconate, maleic acid monoallyl ester (half ester), fumaric acid monoallyl ester (half ester) or itaconic acid monoallyl ester (half ester).

The grafting monomer may be used in the first-stage polymerization in an amount of not more than 5% by weight, preferably in an amount of not more than 2% by weight, and most preferably in an amount of not more than 1% by weight, based on the total monomers used in the first-stage polymerization.

It is preferred that the core is polymerized from a monomer mixture composed of 50-99.99% by weight of aromatic vinyl monomer, 0-44.99% by weight of non-aromatic vinyl monomer copolymerizable with the aromatic vinyl monomer, 0.01-5% by weight of cross-linking monomer, and 0-5% by weight of grafting monomer to, thereby to form a polymer as a core layer having a higher refractive index than the shell layer which will be described hereinafter.

According to the invention, it is most preferred that the core is polymerized from a monomer mixture composed of 80-99.5% by weight of aromatic vinyl monomer, 0-20% by weight of non-aromatic vinyl monomer copolymerizable with the aromatic vinyl monomer, 0.1-1% by weight of cross-linking monomer, and 0-1% by weight of grafting monomer.

The second-stage polymerization forms a shell layer on the core to provide a core-shell polymer by the use of a second monomer comprising methyl methacrylate in an amount of not less than 50% by weight based on the total monomer used in the second-stage polymerization.

In the second-stage polymerization, the second monomer may contain other vinyl monomers other than methyl methacrylate and copolymerizable with methyl methacrylate. The said other vinyl monomer includes, for example, an aromatic vinyl monomer as exemplified as the first monomer used in the first-stage polymerization, such as a styrenic monomer, with styrene being most preferred, an alkyl acrylate or alkyl methacrylate (other than methyl methacrylate) wherein the alkyl has 1-10 carbons, a vinyl or vinylidene cyanide monomer, a conjugated aliphatic dienie compound, an $\alpha,\beta$-unsaturated carboxylic acid such as acylic acid or methacylic acid, and a hydroxyalkyl ester of an $\alpha,\beta$-unsaturated carboxylic acid such as a hydroxyalkyl acrylate or hydroxyalkyl methacrylate wherein the alkyl has 1-10 carbons, for instance, hydroxyethyl methacrylate.

In the second-stage polymerization also, such a cross-linking monomer or a grafting monomer as mentioned hereinbefore may be used together with the monomers above mentioned. Either monomer may be used in an amount of not more than 5% by weight, preferably not more than 2% by weight, and most preferably not more than 1% by weight, based on the total monomers used in the second-stage polymerization.

According to a preferred embodiment of the invention, the shell layer is polymerized from a monomer mixture comprising of 80-95% by weight of methyl methacrylate, 20-5% by weight of a vinyl monomer copolymerizable with methyl methacrylate, 0-5% by weight of a cross-linking monomer and 0-5% by weight of a grafting monomer.

According to a more preferred embodiment, the shell layer is polymerized from a monomer mixture comprising of 80-95% by weight of methyl methacrylate, 20-5% by weight of at least one vinyl monomer selected from the group consisting of styrene, methacrylic acid and hydroxyethyl methacrylate, 0-2% by weight of a cross-linking monomer and 0-2% by weight of a grafting monomer in the second-stage polymerization.

The thus obtained shell layer has a lower refractive index than the core layer, and thus the core-shell polymer has a refractive index in the range of 1.52-1.58. Consequently, when an unsaturated polyester resin forms a matrix of a cured resin having a refractive index of n, the core-shell polymer has a refractive index between the value of $n-0.02$ and $n+0.02$, or a refractive index within $\pm 0.02$ from the refractive index of the cured resin. Thus, the use of core-shell polymer as a low shrinking additive in the unsaturated polyester resin provides a molded article of excellent transparence.

It is useful to produce a shell in the second-stage polymerization by the use of a monomer mixture which further contains a monomer having a functional group reactive in the curing stage of the unsaturated polyester resin so that the core-shell polymer is chemically attached to the matrix, and adhesion between the core-shell polymer and the matrix is strengthened. There may be mentioned as such a monomer, for example, an epoxy group containing monomer or a grafting monomer as mentioned hereinbefore.

More specifically, the epoxy group containing monomer may include, for example, glycidyl methacrylate, glycidyl acrylate and allyl glycidyl ether, with glycidyl methacrylate being preferred. The epoxy group containing monomer may be used in an amount of not more than 20% by weight, preferably not more than 10% by weight, based on the total monomers used i n the second-stage polymerization.

It is also useful to produce a shell in the second-stage polymerization by the use of a monomer mixture which further contains such a monomer as improves the miscibility of the shell layer with the unsaturated polyester resin so that the core-shell polymer has accordingly an improved dispersibility in the unsaturated polyester resin. There may be mentioned as such a monomer, for example, a monomer which contains a carboxyl or hydroxyl group, or a vinyl ester monomer.

The carboxyl group containing monomer includes, for example, acrylic acid, methacrylic acid, itaconic acid, fumaric acid, maleic acid and citraconic acid, with methacrylic acid being preferred. The hydroxyl group containing monomer includes, for example, hydroxyethyl methacrylate, hydroxyethyl acrylate and hydroxypropyl methacrylate, with hydroxyethyl methacrylate being preferred. These monomers may be used in an amount of not more than 20% by weight, preferably not more than 10% by weight, based on the total monomers used in the second-stage polymerization.

The vinyl ester monomer includes, for example, vinyl acetate, vinyl propionate and vinyl chloroacetate, with vinyl acetate being preferred. The vinyl ester monomer may be used in an amount of not more than 20% by weight, preferably not more than 10% by weight, based on the total monomers used in the second-stage polymerization.

The core-shell polymer of the invention has the core layer in an amount of 50–90% by weight, and the shell layer in an amount of 50–10% by weight, and preferably the core layer in an amount of 60–80% by weight, and the shell layer in an amount of 40–20% by weight. When the core-shell polymer has the core layer in an amount of less than 50% by weight, the use of such a core-shell polymer as a low shrinking additive in an unsaturated polyester resin fails to provide a molded article having an excellent transparence, whereas when the core-shell polymer has the core layer in an amount of more than 90% by weight, such a core-shell polymer is poor in dispersibility in an unsaturated polyester resin, and is accordingly unsuitable for use as a low shrinking additive in the unsaturated polyester resin.

The shell layer may be formed as such serial or consequent layers as have a refractive index which is reduced from the central layer to the outer layer.

According to the invention, the core-shell polymer for use as a low shrinking additive in an unsaturated polyester resin has an average particle size preferably of 100–800 nm. When the average particle size is more than 800 nm, the resultant unsaturated polyester resin composition may provide a molded article having a reduced transparence, whereas when the average particle size is less than 100 nm, the core-shell polymer may be ineffective as a low shrinking additive.

The core-shell polymer of the invention is produced by a multi-stage seed emulsion polymerization method as set forth hereinbefore. The resultant latex is separated by a freeze-thaw or salting-out procedure, and is then centrifugally dehydrated and dried, to thereby provide a core-shell polymer in the form of powder. When a spray-drying technique is used, the core-shell polymer may be directly harvested from the latex or suspension.

The core-shell polymer of the invention may be added as it is as a low shrinking additive to an unsaturated polyester resin. However, the core-shell polymer may be first dispersed in a vinyl monomer exemplified by styrene, and then the dispersion may be admixed with the unsaturated polyester to prepare an unsaturated polyester resin composition.

The unsaturated polyester resin composition of the invention is comprised of an unsaturated polyester, a vinyl monomer copolymerizable thererwith, and a core-shell polymer as a low shrinking agent as above set forth. Usually, the unsaturated polyester resin composition of the invention may further contain a polymerization inhibitor, polymerization initiator, a filler, a mold releasing agent, a pigment and a thickener, among others, so that the resin composition may be advantageously used as a resin paste. The resin paste may be further combined with a fibrous reinforcement, namely the fibrous reinforcement may be impregnated with the resin paste.

The unsaturated polyester used in the invention may be a conventional one, and it is usually produced by the condensation of an $\alpha,\beta$-ethylenically unsaturated dicarboxylic acid and a dihydric glycol. If necessary, a saturated aliphatic or aromatic dicarboxylic acid, or dicyclopentadiene copolymerizable with the carboxylic acid may also be used together.

There may be used as such an $\alpha,\beta$-ethylenically unsaturated dicarboxylic acid, for example, maleic acid, fumaric acid, itaconic acid or citraconic acid, or their anhydrides. There may be mentioned as such a saturated aliphatic or aromatic dicarboxylic acid copolymerizable with the above $\alpha,\beta$-ethylenically unsaturated dicarboxylic acid, for example, adipic acid, sebacic acid, succinic acid, gluconic acid, phthalic anhydride, o-phthalic acid, isophthalic acid, terephthalic acid, tetrhydrophthalic acid or tetrachlorophthalic acid.

The above mentioned dihydric glycol used for the production of an unsaturated polyester may include, for example, an alkane diol, oxaalkane diol, a diol (dihydric alcohol) composed of an adduct of an alkylene oxide such as ethylene oxide or propylene oxide to bisphenol A or the like, or its hydrogenated product. If necessary, a monool (monohydric alcohol) or a triol (trihydric alcohol) may also be used together with the glycol.

The alkane diol includes, for example, ethylene glycol, 1,2-propylene glycol, 1,3-propylene glycol, 1,3-butanediol, 1,4-butanediol, neopentyl glycol, 1,5-pentanediol, 1,6-hexanediol and cyclohexanediol. The oxaalkane diol includes, for example, dioxyethylene glycol and trioxyethylene glycol. If necessary, a monool such as octyl alcohol or oleyl alcohol, or a trihydric alcohol such as trimethylol propane may be used together with the glycol.

The unsaturated polyester is produced usually by reacting such a dicarboxylic acid and a glycol (and if necessary, together with a mono- or a trialcohol) as above mentioned under heating to carry out the condensation therebetween while removing the generated water from the reaction mixture. The unsaturated polyester used in the invention has an average molecular weight preferably of 800–4000 and an acid value of 20–60.

The vinyl monomer used together with the unsaturated polyester to provide an unsaturated polyester resin is a monovalent vinyl monomer copolymerizable with the unsaturated polyester, and may be exemplified by an aromatic vinyl monomer such as styrene, $\alpha$-methylstyrene or p-chlorostyrene, or vinyltoluene or vinylnaphthalene, with a styrenic monomer being preferred such as styrene, $\alpha$-methylstyrene or p-chlorostyrene, or an acrylic monomer such as acrylic acid, methyl acrylate, methacrylic acid, methyl methacrylate or acrylonitrile. The vinyl monomer is usually used as a reactive diluent to form an unsaturated polyester resin. A further diluent may also be used, if necessary, as known in the art.

A polyvalent monomer may also be used together with the monovalent vinyl monomer, if necessary. Such a polyvalent monomer may be exemplified by a dimethacrylate or a diacrylate of an alkane polyol of 2–12 carbons, such as ethylene glycol dimethacrylate, diethylene glycol dimethacrylate, triethylene glycol dimethacrylate, propylene glycol dimethacrylate, dipropylene glycol dimethacrylate, 1,4-butanediol dimethacrylate, neopentyl glycol dimethacrylate, 1,6-hexanediol dimethacrylate, ethylene glycol diacrylate, 1,3-propanediol diacrylate, 1,4-butanediol diacrylate, neopentyl glycol diacrylate, 1,6-hexanediol diacrylate, trimethylol propane dimethacrylate, glycerine dimethacrylate, pentaerythritol dimethacrylate, or trimethylol propane diacrylate.

Further examples of polyvalent monomer is a polymethacrylate or a polyacrylate of an alkane polyol of 3–12 carbons, such as trimethylol propane trimethacrylate, glycerine trimethacrylate, pentaerythritol trimethacrylate, glycerine triacrylate, pentaerythritol triacrylate, pentaerythritol tetramethacrylate, dipentaerythritol hexamethacrylate, pentaerythritol tetraacrylate, or dipentaerythritol hexaacrylate.

The inhibitor used includes, for example, p-benzoquinone (PBQ), methyl t-butyl hydroquinone (MTBHQ), 3,5-di-t-butyl-4-hydroxytoluene or 2,5-di-t-butyl-4-methylphenol (BHT), hydroquinone (HQ) or t-butyl-catechol (TBC).

The unsaturated polyester resin composition of the invention comprises 20-90% by weight of unsaturated polyester, 20-70% by weight of monovalent vinyl monomer copolymerizable with the unsaturated polyester and 1-30% by weight of low shrinking additive.

The polymerization initiator used may be usually a conventional organic peroxide such as t-butyl peroxybenzoate (TBPB), t-butyl peroxyoctoate (TBPO), 2,5-dimethyl-2,5-di(benzoylperoxy)cyclohexane (DDBPH), t-amyl peroxyoctoate (TAPO) or t-butylisopropyl carbonate (TBIPC). Usually one or more may be selected from these depending upon a required curing rate. The initiator may be used in an amount of 0.3-4 parts by weight in relation to 100 parts by weight of the resin composition.

The resin composition may further contain a curing accelerator such as an organometallic compound of cobalt, copper or manganese. More specifically, it includes, for instance, octoates, naphthenates or acetylacetonates. The curing accelerator may be used in an amount of 20-200 ppm singly or as a mixture in relation to 100 parts by weight of the resin composition.

The resin composition may further contain a filler, a mold releasing agent, a pigment or a thickener, if necessary. There may be used as a filler, for example, calcium carbonate, aluminum hydroxide, talc, silica, clay, glass powder or glass balloon. The mold releasing agent used includes, for example, metal soap such as zinc stearate or calcium stearate, or fluorinated organic compound or a phosphoric acid derivative. The pigment used includes, for example, titanium dioxide, carbon black, ferric oxide or phthalocyanine. The thickener used includes, for example, oxides or hydroxides of magnesium or calcium.

There may be used glass fibers usually as the reinforcement. The glass fiber preferably has a diameter of 8-20 microns and a length of 1-50 mm. Other reinforcements of inorganic or organic fibers may also be used such as carbon fibers, aramid fibers or vinylon fibers. The fibrous reinforcement may be used in an amount of about 3-40% by weight based on the total weight of unsaturated polyester resin composition.

The unsaturated polyester resin composition of the invention can be formed into a molding compound in the form of sheet such as SMC (sheet molding compound) or TMC (thick molding compound), or a molding compound in the bulk form such as BMC (bulk molding compound) by a conventional method. When a thickener is used, the molding compound is aged and then molded.

The unsaturated polyester resin composition of the invention may be molded at a temperature of 80°-160° C. under a pressure of 10-120 kgf/cm² with a compression or an injection molding machine to provide to a molded article.

The invention will be described in more detail with reference to examples together with comparative examples, however, the examples are intended to illustrate the invention only, and should by no means be construed as being limitative of the scope of the invention.

In the examples and comparative examples, all parts are by weight and the abbreviations used therein have the following meanings.

| Abbreviations | |
|---|---|
| Methyl methacrylate | MMA |
| Styrene | St |
| Allyl methacrylate | AlMA |
| Divinylbenzene*) | DVB |
| Methacrylic acid | MAA |
| 2-Hydroxyethyl methacrylate | HEMA |
| Deionized water | DIW |
| Sodium dioctyl sulfosuccinate | SSS |
| Sodium persulfate | SPS |
| Sodium hydrogen carbonate | SHC |

*)Composed of 58% by weight of divinylbenzene and 42% by weight of aromatic vinyl monomers.

Measurement of Properties of Core-Shell Polymer

The weight average particle size of core-shell polymer was measured with a laser particle analyzing system Model LPA-3000 available from Otsuka Electronics Co., Ltd. The refractive index was measured by use of an Abbe's refractometer with a sheet of 0.3 mm thick prepared by heat-pressing the core-shell polymer.

EXAMPLE 1

Production of Core-Shell Polymer as Low Shrinking Additive A

A two liter capacity polymerization equipment equipped with a reflux condenser was charged with 560 g of DIW, 10 g of 2% aqueous solution of SSS and 40 g of 1% aqueous solution of SHC, and the charge was heated to 75° C. in a nitrogen stream with stirring. Then, 40 g of MMA were added and dispersed over a period of ten minutes, after which 80 g of 2% aqueous solution of SPS were added. The charge was reacted to form a seed latex.

An amount of 1030.2 g of an emulsified monomer mixture for the first-stage polymerization composed of the components below was added to the seed latex continuously over a period of three hours. The mixture was then heated to 90° C., followed by ageing at the temperature of 90° C. for one hour.

| The emulsified monomer mixture for the first-stage polymerization | |
|---|---|
| St: | 656.5 g |
| DVB: | 3.5 g |
| 2% Aqueous solution of SSS: | 290.0 g |
| 1% Aqueous solution of SHS: | 40.0 g |
| DIW: | 40.0 g |

The temperature of the mixture was cooled to 70° C., and 20 g of 2% aqueous solution of SPS were added to the mixture, and then 420 g of an emulsified monomer mixture for the second-stage polymerization composed of the components below were added continuously over a period of one hour.

| The emulsified monomer mixture for the second-stage polymerization | |
|---|---|
| MMA | 293.4 g |
| St: | 6.6 g |
| 1% Aqueous solution of SSS: | 60.0 g |
| 1% Aqueous solution of SHS: | 20.0 g |
| DIW: | 40.0 g |

The mixture was heated to 90° C., and aged at the temperature for one hour. Thereafter, the reaction mixture was cooled to a temperature below 40° C., and was then filtered through a 300-mesh stainless steel sieve to provide a latex of core-shell polymer having a solid content of 45.7% and a weight average particle size of 385 nm. The latex was spray-dried at an inlet temperature of 140° C. and an outlet temperature of 70° C. to provide a low shrinking additive A having a particle size of 50–100 microns.

EXAMPLE 2-5

Production of Core-Shell Polymers as Low Shrinking Additives B to E

The low shrinking additives B to E were produced from the monomers as indicated in the Table 1.

EXAMPLE 6

Production of Core-Shell Polymer as Low Shrinking Additive F

A two liter capacity polymerization equipment equipped with a reflux condenser was charged with 193 g of DIW, 2.7 g of 2% aqueous solution of SSS and 13.3 g of 1% aqueous solution of SHC, and the charge was heated to 70° C. in a nitrogen stream with stirring. Then, 3.3 g of MMA were added and dispersed over a period of ten minutes, after which 25 g of 2% aqueous solution of SPS were added. The charge was reacted to form a seed latex.

After the mixture was heated to 90° C., 47.3 g of 2% aqueous solution of SPS were added, and then 1463.9 g of an emulsified monomer mixture for the first-stage polymerization composed of the components below were added to the seed latex continuously over a period of six hours. The mixture was then heated to 90° C., followed by ageing at the temperature of 90° C. for one hour.

| The emulsified monomer mixture for the first-stage polymerization | |
|---|---|
| St: | 656.5 g |
| DVB: | 3.5 g |
| MMA: | 36.7 g |
| 1% Aqueous solution of SSS: | 580.0 g |
| 1% Aqueous solution of SHS: | 40.0 g |
| DIW: | 147.0 g |

The temperature of the mixture was cooled to 80° C., and 20 g of 2% aqueous solution of SPS were added to the mixture, and then 440 g of an emulsified monomer mixture for the second-stage polymerization composed of the components below were added continuously over a period of two hours.

| The emulsified monomer mixture for the second-stage polymerization | |
|---|---|
| MMA | 263.4 g |
| St: | 6.6 g |
| MAA | 30.0 g |
| 1% Aqueous solution of SSS: | 120.0 g |
| 1% Aqueous solution of SHS: | 20.0 g |

The mixture was heated to 90° C., and aged at the temperature for one hour. Thereafter, the reaction mixture was cooled to a temperature below 40° C., and was then filtered through a 300-mesh stainless steel sieve to provide a latex of core-shell polymer having a solid content of 44.9% and a weight average particle size of 650 nm. The latex was spray-dried at an inlet temperature of 140° C. and an outlet temperature of 70° C. to provide a low shrinking additive F having a particle size of 50–100 microns.

EXAMPLES 7 AND 8

Production of Core-Shell Polymers as Low Shrinking Additives G and H

The low shrinking additives G and H were produced in the same manner as in the Example 6 from monomers as indicated in the Table 1.

TABLE 1

| | Low Shrinking Additive | | | |
|---|---|---|---|---|
| | A | B | C | D |
| Core/Shell Weight Ratio | 70/30 | 70/30 | 70/30 | 70/30 |
| Composition of Core | | | | |
| Monomers | MMA/St/DVB | MMA/St/DVB | MMA/St/DVB | MMA/St/DVB/AlMA |
| Weight Ratio | 5.7/93.8/0.5 | 5.7/93.9/0.4 | 5.7/94.1/0.2 | 5.7/93.8/0.2/0.3 |
| Composition of Shell | | | | |
| Monomers | MMA/St | MMA/St | MMA/St | MMA/St |
| Weight Ratio | 97.8/2.2 | 97.8/2.2 | 97.8/2.2 | 97.8/2.2 |
| Particle Size (nm) | 385 | 388 | 377 | 382 |
| Refractive Index | 1.5588 | 1.5579 | 1.5569 | 1.5570 |

| | Low Shrinking Additive | | | |
|---|---|---|---|---|
| | E | F | G | H |
| Core/Shell Weight Ratio | 70/30 | 70/30 | 70/30 | 70/30 |
| Composition of Core | | | | |
| Monomers | MMA/St/DVB | MMA/St/DVB | MMA/St/DVB | MMA/St/DVB |
| Weight Ratio | 5.7/93.8/0.5 | 5.7/93.8/0.5 | 5.7/93.8/0.5 | 5.7/93.8/0.5 |
| Composition of Shell | | | | |
| Monomers | MMA/MAA | MMA/St/MAA | MMA/St/HEMA | MMA/St/AlMA |
| Weight Ratio | 90/10 | 87.8/2.2/10 | 87.8/2.2/10 | 95.8/2.2/2.0 |
| Particle Size (nm) | 366 | 650 | 680 | 630 |
| Refractive Index | 1.5594 | 1.5601 | 1.5596 | 1.5574 |

EXAMPLE 9

Production of Unsaturated Polyester Resin Composition

According to the formulation as indicated in the Table 2, an unsaturated polyester resin composition was produced by the use of an unsaturated polyester resin (Polymal 6317, available from Takeda Chemical Industries, Ltd., providing a cured material having a refractive index of 1.5561), MTBHQ (inhibitor), a curing agent (BIG-75, available from Kayaku Akzo K.K.), a filler (glass powder H-60S, available from Nippon Ferro K.K.), zinc stearate (mold releasing agent), magnesium oxide (thickener) and a toner (the same unsaturated polyester resin as used in the formulation mixed with 10% of titanium dioxide).

TABLE 2

| Materials | Amounts (parts) |
| --- | --- |
| Unsaturated polyester resin | 95 |
| Low shrinking additive A | 5 |
| MTBHQ | 0.03 |
| BIC-75 | 1.5 |
| Toner | 2 |
| M-60S | 250 |
| Zinc stearate | 4 |
| Magnesium oxide | 1 |
| Glass chopped strands | 5% |

The unsaturated polyester and the above materials other than the thicker and a low shrinking additive were kneaded together for five minutes, and then a low shrinking additive was added to the mixture. The mixture was further kneaded until the low shrinking additive was evenly dispersed. The time needed for the additive to be evenly dispersed in the mixture is shown in the Table 3 as the dispersibility.

TABLE 3

| Low Shrinking Additives | Dispersibility of Low Shrinking Additive (sec.) |
| --- | --- |
| A | 180 |
| B | 190 |
| C | 170 |
| D | 180 |
| E | 170 |
| F | 170 |
| G | 180 |
| H | 160 |
| I | 180 |
| J | 480 |
| SGP70C | 320 |
| P-5001 | 450 |

Thereafter, a thicker was added to the mixture, and then kneaded for two minutes. Finally, glass chopped strands were added in an amount of 5% by weight based on the total weight of resin composition. The resultant resin composition was aged at 40° C. for 72 hours, and after the PV value reach ed below 60, the composition was used for molding.

EXAMPLES 10 TO 16

Production of Unsaturated Polyester Resin Composition

The low shrinking additives B, C, D, E, F, G and H were each used in place of the low shrinking additive A, and otherwise the same manner as in the Example 7, unsaturated polyester resin compositions (2) to (8) were produced, respectively. With each composition, the time needed for the additive to be evenly dispersed in the mixture is shown in the Table 3.

COMPARATIVE EXAMPLES 1 AND 2

Production of Low Shrinking Additives I and J

Low shrinking additives I and J were produced from the monomers as indicated in the Table 4. The low shrinking additive I was composed of a core-shell polymer having a refractive index below 1.52, whereas the low shrinking additive J was composed of a single layer polymer having no shell.

TABLE 4

| | Low Shrinking Additive | |
| --- | --- | --- |
| | I | J |
| Core/Shell Weight Ratio | 30/70 | 100/0 |
| Composition of Core | | |
| Monomers | MMA/St/DVB/AlMA | MMA/St/DVB |
| Weight Ratio | 5.7/93.8/0.2/0.3 | 5.7/93.8/0.5 |
| Composition of Shell | | |
| Monomers | MMA | — |
| Weight Ratio | 100 | — |
| Particle Size (nm) | 376 | 316 |
| Refractive Index | 1.5181 | 1.5868 |

COMPARATIVE EXAMPLES 3 TO 6

Production of Unsaturated Polyester Resin Composition

With use of the low shrinking additives I, J, cross-linked polystyrene particles SGP-70C (having a particle size of 5–30 microns, available from Soken Kagaku K.K.) and cross-linked polymer particles Microgel P-5001 (mainly composed of polystyrene having a particle size of 50 nm) in place of the low shrinking additive A, unsaturated polyester resin compositions (9) to (12) were produced, respectively, in the same manner as in the Example 6. With each composition, the time needed for the additive to be evenly dispersed in the mixture is shown in the Table 3.

A sheet of 8 mm thick and 300 mm square prepared by compression-molding at a temperature of 140° C. under a pressure of 100 kgf/cm² for eight minutes from the unsaturated polyester resin compositions (1) to (12) each.

The properties of the sheet are shown in the Table 5. The shrinkage was measured by comparing the size of the molded sheet at normal temperature with the size of the molds used. The gloss was measured with a gloss-meter IG-310 (K.K. Horiba Seisakusho), and light transmission with a turbidimeter 300A (Nippon Denshoku K.K.).

Figure 2:
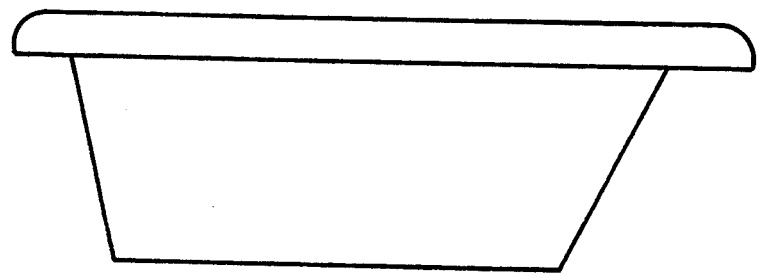
FIG. 2 is a front view of the miniature bathtub as shown in FIG. 1.

A miniature bathtub having an apron and a bottom each having a thickness of 8 mm and a side wall having a thickness of 8 mm as indicated in FIGS. 1 and 2 was produced by molding a bulk molding compound at a temperature of 145°/140° C. (core/cavity) under a pressure of 100 kgf/cm² for ten minutes, and it was checked to determine if molding defects such as cracks were formed thereon. The results are shown in the Table 5.

TABLE 5

| Resin Composition | Low Shrinking Additive | Shrinkage (%) | Gloss | Light Transmission (%) | Moldability |
| --- | --- | --- | --- | --- | --- |
| (1) | A | 0.48 | 78 | 20.8 | Excellent |
| (2) | B | 0.47 | 71 | 19.5 | Excellent |

TABLE 5-continued

| Resin Composition | Low Shrinking Additive | Shrinkage (%) | Gloss | Light Transmission (%) | Moldability |
|---|---|---|---|---|---|
| (3) | C | 0.46 | 75 | 19.7 | Excellent |
| (4) | D | 0.48 | 75 | 21.5 | Excellent |
| (5) | E | 0.50 | 80 | 20.8 | Excellent |
| (6) | F | 0.45 | 91 | 20.8 | Excellent |
| (7) | G | 0.44 | 86 | 19.4 | Excellent |
| (8) | H | 0.46 | 91 | 20.1 | Excellent |
| (9) | I | 0.51 | 73 | 15.3 | Excellent |
| (10) | J | 0.49 | 79 | 21.5 | Excellent |
| (11) | SGP70C | 0.67 | 65 | 22.5 | Bad*) |
| (12) | P-5001 | 0.71 | 68 | 25.3 | Bad*) |

*)Cracks were formed on molded articles.

What is claimed is:

1. An unsaturated polyester resin composition for the production of a cured molded article which comprises: an unsaturated polyester resin; and a core-shell polymer as a low shrinking agent which comprises:

(a) a cross-linked core layer polymerized from a first vinyl monomer comprising an aromatic vinyl monomer in an amount of not less than 50% by weight, the core layer being contained in the core-shell polymer in an amount of 50–90% by weight; and (b) a shell layer polymerized from a vinyl monomer comprising methyl methacrylate in an amount of 80–95% by weight, 20–5% by weight of at least one vinyl monomer selected from the group consisting of styrene, glycidyl methacrylate, methacrylic acid, hydroxyethyl methacrylate and vinyl acetate, 0–2% by weight of a cross-linking monomer and 0–2% by weight of a graft-linking monomer;

wherein the core-shell polymer has a particle size of 100–800 nm and a refractive index in the range of 1.52–1.58 and within ±0.02 from the refractive index of the cured material of the unsaturated polyester resin composition.

2. The unsaturated polyester resin composition as claimed in claim 1 wherein the core layer is polymerized from a monomer comprising not less than 50% by weight of an aromatic vinyl monomer and 0.01–5% by weight of a cross-linking monomer, and the shell layer is polymerized from a monomer comprising methyl methacrylate in an amount of 60–80% by weight.

3. The unsaturated polyester resin composition as claimed in claim 1 wherein the core layer is polymerized from a monomer comprising 50–99.99% by weight of an aromatic vinyl monomer, 0–44.99% by weight of a non-aromatic vinyl monomer, 0.01–5% by weight of a cross-linking monomer and 0–2% by weight of a graft-linking monomer.

4. The unsaturated polyester resin composition as claimed in claim 1 wherein the core layer is polymerized from a monomer comprising 80–99.5% by weight of an aromatic vinyl monomer, 0–20% by weight of a non-aromatic vinyl monomer, 0.01–1% by weight of a cross-linking monomer and 0–1% by weight of a graft-linking monomer.

5. The unsaturated polyester resin composition as claimed in claim 1 wherein the aromatic vinyl monomer is a styrenic monomer selected from the group consisting of styrene, α-methyl styrene and mono chlorostyrene.

6. The unsaturated polyester resin composition as claimed in claim 1 wherein the aromatic vinyl monomer is styrene.

7. The unsaturated polyester resin composition as claimed in claim 1 wherein the shell layer is polymerized from a monomer mixture comprising 80–95% by weight of methyl methacrylate, 20–5% by weight of at least one vinyl monomer selected from the group consisting of styrerie, methacrylic acid and hydroxyethyl methacrylate, 0–2% by weight of a cross-linking monomer and 0–2% by weight of a graft-linking monomer.

* * * * *